Nov. 2, 1948.   C. E. CLEETON   2,452,549
DOUBLE PULSE GENERATOR
Filed June 24, 1939   2 Sheets-Sheet 1

INVENTOR
CLAUD E. CLEETON
BY
ATTORNEY

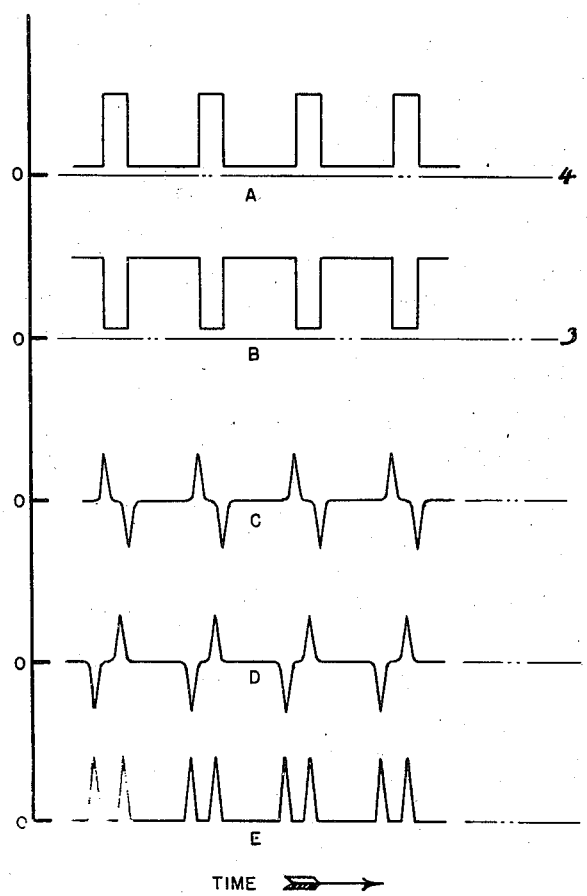

Patented Nov. 2, 1948

2,452,549

UNITED STATES PATENT OFFICE 2,452,549

DOUBLE PULSE GENERATOR

Claud E. Cleeton, Washington, D. C.

Application June 24, 1939, Serial No. 280,930

15 Claims. (Cl. 250—36)

(Granted under the act of March 3, 1883, as amended April 30, 1928; 370 O. G. 757)

This invention relates to means for generating voltage pulses in pairs.

Among the several objects of this invention are:

To provide means for generating voltage pulses in pairs with provision for varying the time between the pulses in each pair or the time between pairs of pulses over a considerable range of values;

To provide means of the type described comprising a "scale of two" electronic switch;

To provide apparatus as described capable of operating automatically or of being controlled manually.

A further object to provide means for producing a square wave in which the ratio of the positive and the negative parts of a cycle may be varied at will.

Other objects will become apparent from the following description when read in connection with the accompanying drawings wherein:

Fig. 2 depicts the voltage relations among several of the electrode elements of the tubes employed in Fig. 1.

Figure 1:
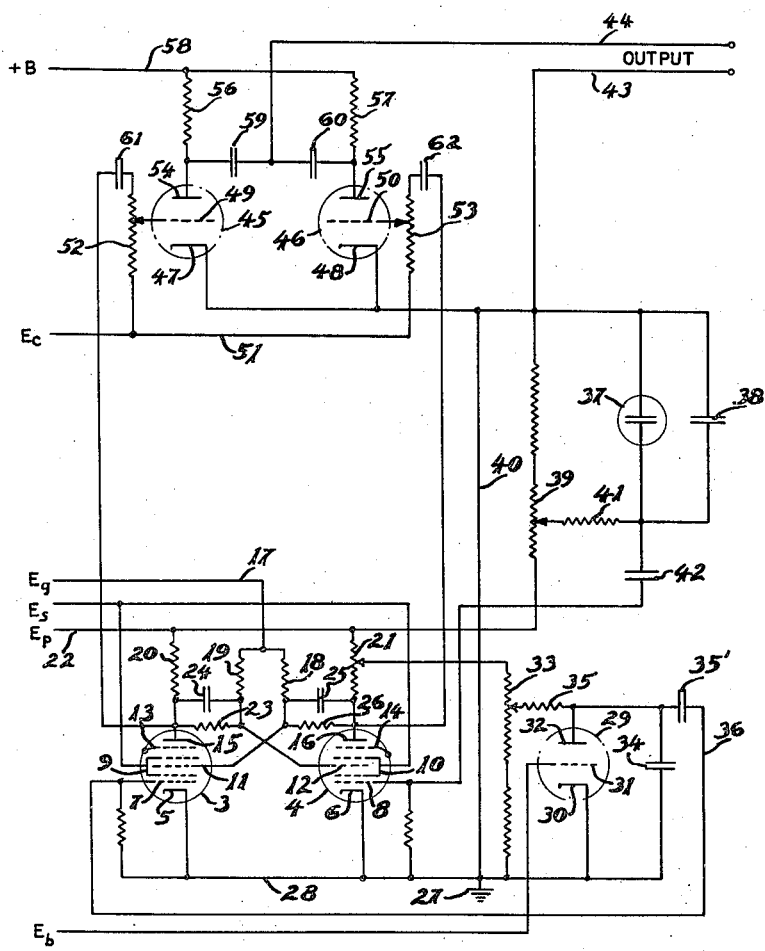
Fig. 1 is a schematic circuit diagram of an efficient form of my invention.

There are many types of signaling and measurements utilizing radio waves wherein it is desirable to generate voltage pulses in pairs, particularly when the time between the pulses in each pair or the time between pairs of pulses may be varied. One such use is for testing electronic counter circuits. The resolution of the counter may be determined by decreasing the time between pulses until the counter fails to respond correctly. If evenly spaced pulses are applied to such a counter, resonance effects may give an incorrect result.

The only other two-pulse generator with which I am familiar uses gas triodes and a circuit that requires external synchronization. It is not as stable as my present invention and requires more than one power supply for operation. The circuit of Fig. 1 may be operated from a single rectified voltage supply, is stable to a high degree, allows accurate control of time spacing and control of the pulse groups.

The apparatus illustrated in Fig. 1 embodies a self-locking electron relay circuit that is disclosed and claimed in my copending application, Serial No. 315,340, filed January 24, 1940. It has certain resemblances to well-known "scale of two" counter circuits but differs therefrom in that the signal grids are separated to make a self-locking electronic relay.

Referring now to Fig. 1, the tubes 3 and 4 are shown as being of the pentagrid type having, respectively, cathodes 5 and 6, control grids 7 and 8, screen grids 9 and 10, signal grids 11 and 12, auxiliary grids 13 and 14 and anodes 15 and 16. Signal grids 11 and 12 are respectively connected to a source of negative biasing potential by the common lead 17 and the respective resistors 18 and 19. Anodes 15 and 16 are connected through anode resistors 20 and 21 to a common positive supply lead 22, anode 15 being further connected to grid 12 of tube 4 by resistor 23 and capacitor 24 in parallel while anode 16 is similarly connected through capacitor 25 and resistor 26 to grid 11 of tube 3.

According to the well-known functioning of devices similar to that above described, there is always some unbalance that results in one tube or the other passing current when the operating potentials are applied and further, there are but two stable conditions, namely, when either tube is passing plate current while the other plate current is blocked. Assume that tube 3 passes more current than tube 4 when the operating potentials are applied. This will result in a potential drop across resistor 20 that will be applied through capacitor 24 upon grid 12 of tube 4 which will further reduce the current in tube 4 and cause an amplified voltage rise to appear on anode 16 that will in turn be applied to grid 11 through capacitor 25 and still further increase the flow through tube 3. This amplification is repeated very rapidly and in a very short time the plate current of tube 4 is blocked and tube 3 is passing maximum current. Owing to the arrangement of the circuit elements, this condition will continue until interrupted by some extraneous influence.

The means for changing the current flow conditions in tubes 3 and 4 includes the gas triode 29 having a cathode 30 connected to lead 28, a grid 31 and an anode 32. Charging resistor 33 is connected to lead 28 and also variably connected to anode resistor 21, anode 32 of tube 29 and one side of capacitor 34 being variably connected to charging resistor 33 through a resistor 35, cathode 30 of tube 29 and the other side of capacitor 34 being connected to ground lead 28. It is thus apparent that the potential applied across capacitor 34 when tube 29 is not passing current will be the potential drop between the point of connection of resistor 35 to charging resistor 33 and ground lead 28. When tube 4 is passing current this potential drop is insufficient to ignite tube 29 but when tube 4 is blocked the potential on capacitor 34 builds up to a value sufficient to cause tube 29 to become conducting. As is well known, the time required for capacitor 34 to reach the breakdown potential of tube 29 is determined by the value of capacitor 34 and the resistance in series therewith. When tube 29 is ignited, the drop of potential across the resistors between cathode 30 and anode 32 sets up a negative potential pulse that is applied to grid 7 of tube 3 through capacitor 35' and lead 36 which reduces the flow of current in tube 3 causing a rise of potential on grid 12 of tube 4 and a resulting amplified drop of potential applied to grid 11 of tube 3 which blocks tube 3 and permits flow of current through tube 4. As above stated so long as tube 4 passes current the tube 29 remains quiescent.

If it is desired that tubes 3 and 4 should be changed automatically from the conducting to the quiescent condition, a low frequency oscillator may be provided. In Fig. 1 this oscillator is shown as being of the relaxation type and comprises a gas diode 37 in parallel with a capacitor 38 variably connected across a resistor 39 having one terminal connected to anode supply lead 22 and the other connected to ground through the lead 40. As is well known, capacitor 38 will build up a potential that finally reaches the breakdown voltage of tube 37 which renders the tube conducting with a resultant drop in potential across resistors 39 and 41 whereby a negative pulse is applied to grid 8 of tube 4 through capacitor 42. Thus, whenever tube 37 passes current while tube 4 is conducting, the flow of current through that tube will be interrupted and it will become quiescent with the result that tube 3 will again conduct with the simultaneous building up of potential on capacitor 34 as above set forth.

The pulses are ultimately applied to output leads 43 and 44 by output tubes 45 and 46, whereof cathodes 47 and 48 are connected to ground through lead 40, grids 49 and 50 are connected to a grid bias lead 51 through variable resistors 52 and 53 and anodes 54 and 55 are connected to a source of positive potential through the respective resistors 56 and 57 connected to common lead 58. Anodes 54 and 55 are connected to common output lead 44 through capacitors 59 and 60, while grids 49 and 50 are respectively connected through capacitors 61 and 62 to anodes 15 and 16 of relay tubes 3 and 4. The potential applied to grids 49 and 50 through lead 51 is such as normally to block tubes 45 and 46. However, when the relay tube 3 or 4 to which an output tube 45 or 46 is connected is changed to the nonconducting condition the resultant rise of voltage on the anode of the relay tube is transmitted as a positive pulse to the grid of the output tube which transiently unblocks that output tube to apply a pulse of voltage to output lead 44. It is apparent that tubes 45 and 46 will be conducting for only a very short time since only the change of positive potential will be applied through capacitor 61 or 62 to grid 49 or 50.

The operation of the system is as follows:

Assume tube 3 to be passing current. It is apparent that so long as tube 4 is quiescent any negative pulses applied to grid 8 through capacitor 42 will have no effect upon the operation of the apparatus. However, capacitor 34 will be acquiring a charge and at the end of the predetermined period tube 29 will break down and a negative pulse will be applied to grid 7 which will interrupt the current through tube 3 and thereby cause tube 4 to become conducting. The interruption of the current through tube 3 will result in a rise of voltage on anode 15 that will be transmitted as a pulse of potential to grid 49 of output tube 45 and this tube will therefore transiently pass current and apply a voltage pulse to output lead 44. Upon the next break down of gas diode 37 a negative pulse will be applied through capacitor 42 to grid 8 of tube 4 which will interrupt the passage of current through tube 4 with a concomitant increase of positive potential on anode 16 that will be applied to grid 50 and thus will cause tube 46 to supply a voltage pulse to the common output lead 44.

It will be obvious that by making the period of charging of capacitor 34 very short the pulse applied to output lead 44 through tube 45 may be made to follow closely upon the pulses derived from output tube 46 and by making the period of charging of capacitor 38 long, the time between the pair of pulses may be made comparatively large. It will be obvious to those skilled in this art how the time between pulses of a pair or between the pairs of pulses may be varied.

It will likewise be apparent that variation of the time between the pulses of a group does not change the time between the first pulses of successive groups.

If manual operation is desired, tube 37 and the other elements of the oscillator circuit may be omitted and a potential pulse applied to grid 8 by means of a key or switch connecting grid 8 to negative supply lead 17.

Fig. 2 shows the relations among the potentials upon several elements of the system. The curve designated A shows the variation in the anode potential of tube 4 while curve B shows the potential on the anode of tube 3. It will be noted that these curves are square waves and hence the tubes 3 and 4 and associated circuits may be employed as a square wave generator if desired. Curve C represents the voltage pulses applied to grid 50 of output tube 46 and curve D similarly depicts the voltages applied to grid 49 of tube 45 by tube 3. It will be observed that a positive pulse is applied to grid 50 and shortly thereafter a positive pulse is applied to grid 49, giving rise to two output pulses as shown in curve E wherein it is made apparent that the pulses on output lead 44 are applied in groups of two with a space between each two groups. As above set forth, the period between the pulses in a group or the period between groups may be varied.

The invention herein described and claimed may be used and/or manufactured by or for the Government of the United States of America for governmental purposes without the payment of any royalties thereon or therefor.

I claim:

1. A double pulse generator, comprising two alternately operating relay vacuum tubes each having a cathode, a first grid, a second grid, a screen grid and an anode, a respective grid resistor connected to each said second grid, a common negative grid supply connected to both said resistors, a respective anode resistor connected to each said anode, a common positive anode supply connected to both said anode resistors, a capacitor and resistor in parallel connecting each said second grid to the anode of the other tube; a gas triode tube having a cathode, a grid and an anode, means connecting the cathodes of all said tubes, a charging resistor connected at one terminal to said cathode connecting means and at its other terminal variably connected to the anode resistor of one of said relay tubes, a resistor connected to the anode of said triode and variably connected to said charging resistor, a capacitor connected between the anode and the cathode of said triode, a capacitor connected between the anode of said triode and the first grid of the other of said relay tubes; two output triodes each having an anode, a grid and a cathode, two capacitances in series between the anodes of said output triodes, an output lead connected between said capacitors in series, means to bias the grids of said output triodes normally to cutoff, means including a capacitor respectively connecting the grid of each output triode to the anode of a relay tube; an oscillator resistor connected between said anode supply and ground, a gas diode and a capacitor variably connected in parallel across said oscillator resistor, a capacitor connecting the high potential side of said diode to the first grid of said one relay tube and an output lead connected to the cathodes of said output triodes.

2. A double pulse generator, comprising two alternately operating relay vacuum tubes each having a cathode, a first grid, a second grid, a screen grid and an anode, a respective grid resistor connected to each said second grid, a common negative grid supply connected to both said resistors, a respective anode resistor connected to each said anode, a common positive anode supply connected to both said anode resistors, a capacitor and resistor in parallel connecting each said second grid to the anode of the other tube; a gas triode tube having a cathode, a grid and an anode, means connecting the cathodes of all said tubes, a charging resistor connected at one terminal to said cathode connecting means and at its other terminal variably connected to the anode resistor of one of said relay tubes, a resistor connected to the anode of said triode and variably connected to said charging resistor, a capacitor connected between the anode and the cathode of said triode, a capacitor connected between the anode of said triode and the first grid of the other of said relay tubes; two output tubes normally biased to cutoff, anode, cathode, and control elements in each tube, transiently operative coupling means connecting the control elements to an element of the respective relay tubes to unblock an output tube when flow of current through the respective relay tube is stopped, a low frequency oscillatory circuit connected to apply a negative potential pulse to the first grid of said one relay tube once in each cycle of said oscillator and two output leads respectively connected to the anodes and the cathodes of both said output tubes.

3. A double pulse generator, comprising two alternately operating relay vacuum tubes each having a cathode, a first grid, a second grid, a screen grid and an anode, a respective grid resistor connected to each said second grid, a common negative grid supply connected to both said resistors, a respective anode resistor connected to each said anode, a common positive anode supply connected to both said anode resistors, a capacitor and resistor in parallel connecting each said second grid to the anode of the other tube; a gas triode tube having a cathode, a grid and an anode, means connecting the cathodes of all said tubes, a charging resistor connected at one terminal to said cathode connecting means and at its other terminal variably connected to the anode resistor of one of said relay tubes, a resistor connected to the anode of said triode and variably connected to said charging resistor, a capacitor connected between the anode and the cathode of said triode, a capacitor connected between the anode of said triode and the first grid of the other of said relay tubes; two output tubes normally biased to cutoff, anode, cathode, and control elements in each tube, transiently operative coupling means connecting the control elements to an element of the respective relay tubes to unblock an output tube when flow of current through the respective relay tube is stopped, means to apply periodically a negative potential pulse to the first grid of said one relay tube and two output leads respectively connected to the anodes and the cathodes of both said output tubes.

4. A double pulse generator, comprising two alternately operating relay vacuum tubes each having a first grid, a second grid, a screen grid and an anode, a respective grid resistor connected to each said second grid, a common negative grid supply connected to both said resistors, a respective anode resistor connected to each said anode, a common positive anode supply connected to both said anode resistors, a capacitor and resistor in parallel connecting each said second grid to the anode of the other tube; means operatively connected to one of said relay tubes to build up a potential during quiescence of said one tube and at the end of a predetermined time to apply a negative pulse to the first grid of the other said relay tube; two output triodes each having an anode, a grid and a cathode, two capacitances in series between the anodes of said output triodes, an output lead connected between said capacitors in series, means to bias the grids of said output triodes normally to cutoff, means including a capacitor respectively connecting the grid of each output triode to the anode of a relay tube; an oscillator resistor connected between said anode supply and ground, a gas diode and a capacitor variably connected in parallel across said oscillator resistor, a capacitor connecting the high potential side of said diode to the first grid of said one relay tube and an output lead connected to the cathodes of said output triodes.

5. A double pulse generator, comprising two alternately operating relay vacuum tubes each having cathode, first grid, second grid, and anode elements, suitable supply means operatively connected to said second grid and anode elements, means so interconnecting said elements that interruption of current flow through either of said tubes initiates flow of current through the other thereof; a gas triode tube having a cathode, a grid and an anode, means connecting the cathodes of all said tubes, a charging resistor connected at one terminal to said cathode connecting means and at its other terminal variably connected to the anode supply of one of said relay tubes to produce potential differences across said charging resistor, a resistor connected to the anode of said triode and variably connected to said charging resistor, a capacitor connected between the anode and the cathode of said triode, a capacitor connected between the anode of said triode and the first grid of the other of said relay tubes; two output triodes each having an anode, a grid and a cathode, two capacitances in series between the anodes of said output triodes, an output lead connected between said capacitors in series, means to bias the grids of said output triodes normally to cutoff, means including a capacitor respectively connecting the grid of each output triode to the anode of a relay tube; an oscillator resistor connected between said anode supply and ground, a gas diode and a capacitor variably connected in parallel across said oscillator resistor, a capacitor connecting the high potential side of said diode to the first grid of said one relay tube and an output lead connected to the cathodes of said output triodes.

6. A double pulse generator, comprising two alternately operating relay vacuum tubes each having cathode, first grid, second grid, and anode elements, suitable supply means operatively connected to said second grid and anode elements, means so interconnecting said elements that interruption of current flow through either of said tubes initiates flow of current through the other thereof, means operatively connected to one of said relay tubes to build up a potential during quiescence of said one tube and at the end of a predetermined time to apply a negative pulse to the first grid of the other said relay tube; two output tubes normally biased to cutoff, anode, cathode, and control elements in each tube, transiently operative coupling means connecting the control elements to an element of the respective relay tubes to unblock an output tube when flow of current through the respective relay tube is stopped; a low frequency oscillatory circuit connected to apply a negative potential pulse to the first grid of said one relay tube once in each cycle of said oscillator and two output leads respectively connected to the anodes and the cathodes of both said output tubes.

7. A double pulse generator, comprising two alternately operating relay vacuum tubes each having cathode, first grid, second grid, and anode elements, suitable supply means operatively connected to said second grid and anode elements, means so interconnecting said elements that interruption of current flow through either of said tubes initiates flow of current through the other thereof, means operatively connected to one of said relay tubes to build up a potential during quiescence of said one tube and at the end of a predetermined time to apply a negative pulse to the first grid of the other said relay tube; two output tubes normally biased to cutoff, anode, cathode, and control elements in each tube, transiently operative coupling means connecting the control elements to an element of the respective relay tubes to unblock an output tube when flow of current through the respective relay tube is stopped; means to apply periodically a negative potential pulse to the first grid of said one relay tube and two output leads respectively connected to the anodes and the cathodes of both said output tubes.

8. A double pulse generator, comprising two alternately operating relay tubes each having a plurality of electrode elements, means interconnecting certain said elements of said tubes whereby interruption of the current through either thereof initiates flow of current through the other, means to supply suitable operating potentials to certain of said elements; means operatively connected to one of said relay tubes to build up a predetermined potential when said one tube is quiescent and then apply a potential pulse to a said element of the other relay tube to interrupt the current through said other tube; a respective pulse emitting device, normally inoperative, transiently operative coupling means connecting the devices to an element of the respective relay tubes to operate the devices when flow of current through such tube is interrupted; and means to apply periodically a potential pulse to a said element of said one relay tube to interrupt flow of current therethrough.

9. A double pulse generator, comprising two alternately operating relay tubes each having a plurality of electrode elements, means interconnecting certain said elements of said tubes whereby interruption of the current through either thereof initiates flow of current through the other, means to supply suitable operating potentials to certain of said elements; means operatively connected to one of said relay tubes to build up a predetermined potential when said one tube is quiescent and then apply a potential pulse to a said element of the other relay tube to interrupt the current through said other tube; a respective pulse emitting device, normally inoperative, transiently operative coupling means connecting the devices to an element of the respective relay tubes to operate the devices when flow of current through such tube is interrupted; and means to apply a potential pulse to a said element of said one relay tube to interrupt flow of current therethrough.

10. A double pulse generator, comprising first and second alternative conductive paths for an electric current, each said path including impedance elements across which a potential difference is set up by flow of current through a said path, means interconnecting said paths to apply to one path a said potential difference set up in the other path and to unblock either path when the other is blocked, means energized while said first path is conductive to block said first path after a predetermined interval whereby unblocking potential is applied to said second path, means acting periodically to apply a potential to said second path to block said second path when in conductive condition and thereby to apply a potential to said first path again to unblock said first path, a first and a second space discharge means, means to apply blocking potentials to said discharge means, means respectively connecting said first and second discharge means to said first and second paths to apply to the respective discharge means a transient unblocking potential at the instant the said path connected thereto is blocked, and common output means connected to said discharge means to receive from each a pulse when said discharge means are blocked.

11. A double pulse generator, comprising a device of the locked electronic relay type having two conductive paths, means operating periodically to block one said path when in a conductive condition and so change the current from one said path to the other, means energized while said other path is conductive to block said other path after a predetermined interval and change the current back to said one path, and means comprising a single output signal channel responsive to both said paths and controlled thereby to produce a transient output signal pulse at the instant either path is blocked.

12. A double pulse generator, comprising a device of the locked electronic relay type having two conductive paths, means operating periodically to block one said path when in a conductive condition and so change the current from one said path to the other, capacitance means connected to be charged when said other path is conductive to discharge after a predetermined interval to block said other path and change the current back to said one path, and means comprising a single output signal channel responsive to both said paths and controlled thereby to produce a transient output signal pulse at the instant either path is blocked.

13. In combination, an electron discharge device pulse producing trigger circuit having a stable state and an active state, a connection for supplying a unidirectional current tripping pulse of a predetermined polarity and magnitude to said trigger circuit for changing it from its stable to its active state, an electron discharge device normally biased to cut off, a differentiator circuit coupled between the negative output pulse electrode of said trigger and the input of said discharge device, said differentiator circuit serving to produce a sharp positive pulse from the negative output pulse of said trigger circuit of such magnitude as to overcome the cut off bias on said discharge device and render it momentarily conductive, whereby only the trailing edge of said negative output pulse is effective to produce said sharp positive pulse in said differentiator circuit, and a utilization circuit coupled to an electrode of said discharge device and responsive to a pulse obtained therefrom.

14. In combination, an electron discharge device pulse producing trigger circuit having a stable state and an unstable or active state, a connection for supplying a unidirectional current tripping pulse of a predetermined polarity and magnitude to said trigger circuit for changing it from its stable to its active state, an electron discharge device normally biased to cut off, a differentiator circuit coupled between a particular output electrode of said trigger circuit and the input of said discharge device to thereby produce sharp negative and positive impulses in the order named, from the output pulse applied from said trigger circuit, one of said sharp impulses being of such polarity and magnitude as to overcome the cut off bias on said discharge device and render it momentarily conductive, and a utilization circuit coupled to the anode of said electron discharge device and responsive to a pulse of negative direction obtained therefrom.

15. A time delay circuit furnishing an output pulse of controllable time duration and which starts a controllable time later than an input pulse, comprising an electron discharge device trigger circuit having a stable condition and an unstable condition, said trigger circuit having an adjustable element for controlling the duration of the unstable condition, a connection for supplying an input pulse of negative direction to said trigger circuit of such polarity and magnitude as to change the trigger circuit from its stable to its unstable condition, means for utilizing an output pulse of negative direction produced by said trigger circuit, said means including a differentiating circuit coupled to an output electrode of said trigger circuit, and a vacuum tube normally biased to cut off coupled to said differentiating circuit and responsive to a positive impulse therefrom for passing current, whereby only the trailing edge of the negative output pulse from the trigger circuit is effective to produce said positive impulse in said differentiating circuit, as a result of which a delay is produced substantially equal in duration to the duration of said output pulse from said trigger.

CLAUD E. CLEETON.

REFERENCES CITED

The following references are of record in the file of this patent:

UNITED STATES PATENTS

| Number | Name | Date |
| --- | --- | --- |
| 2,006,737 | Gassford | July 2, 1935 |
| 2,154,492 | Clough | Apr. 18, 1939 |
| 2,166,688 | Kell | July 18, 1939 |